(12) United States Patent
Nakano et al.

(10) Patent No.: US 6,531,552 B2
(45) Date of Patent: Mar. 11, 2003

(54) OLEFIN POLYMERIZATION CATALYST AND METHOD FOR POLYMERIZING OLEFIN USING THE SAME

(75) Inventors: Hiroshi Nakano, Mie (JP); Takao Tayano, Mie (JP); Hideshi Uchino, Mie (JP); Tadashi Takahashi, Mie (JP)

(73) Assignee: Japan Polychem Corporation, Tokyo (JP)

( * ) Notice: Subject to any disclaimer, the term of this patent is extended or adjusted under 35 U.S.C. 154(b) by 239 days.

(21) Appl. No.: 09/756,775

(22) Filed: Jan. 10, 2001

(65) Prior Publication Data

US 2002/0004447 A1 Jan. 10, 2002

(30) Foreign Application Priority Data

May 29, 2000 (JP) ........................................ 2000-158707

(51) Int. Cl.$^7$ ............................. C08F 4/02; C08F 4/642; C04B 35/14; C04B 35/16
(52) U.S. Cl. ................... 526/127; 526/126; 526/154; 526/155; 526/160; 526/943; 502/63; 502/72; 502/73; 502/74; 502/80; 502/81; 502/83; 502/84; 502/87; 502/118; 502/240; 423/326; 423/327.1; 423/328.1
(58) Field of Search .................. 423/326, 327.1, 423/328.1; 502/63, 72, 73, 74, 80, 81, 83, 84, 87, 118, 240; 526/126, 127, 154, 155

(56) References Cited

FOREIGN PATENT DOCUMENTS

| EP | 0 608 988 | 8/1994 |
|---|---|---|
| EP | 0 683 180 | 11/1995 |
| EP | 683 180 A2 * | 11/1995 |

OTHER PUBLICATIONS

Chemical Abstract, AN 1999:23282, JP 11–001509, Jan. 6, 1999.
Chemical Abstract, AN 1998:402810, JP 10–168110, Jun. 23, 1998.
Chemical Abstract, AN 1996:115464, JP 7–309907, Nov. 28, 1995.
Chemical Abstract, AN 2001:91265, JP 2001–031720, Feb. 6, 2001.

\* cited by examiner

*Primary Examiner*—David W. Wu
*Assistant Examiner*—R. Rabago

(57) ABSTRACT

An olefin polymerization catalyst comprising the following components (A) and (B):

Component (A): an ion-exchange layered silicate having an acid site of at most −8.2 pKa, the amount of the acid site is equivalent to at least 0.05 mmol/g of 2,6-dimethylpyridine consumed for neutralization; and Component (B): a compound of a transition metal belonging to Group 3 to Group 12 of the Periodic Table.

13 Claims, No Drawings

OLEFIN POLYMERIZATION CATALYST AND METHOD FOR POLYMERIZING OLEFIN USING THE SAME

The present invention relates to an olefin polymerization catalyst. Particularly, the present invention relates to an olefin polymerization catalyst using a specific co-catalyst having an acidity and an acid strength controlled.

It is well known to produce an olefin polymer by polymerizing an olefin in the presence of a catalyst using a clay or a clay mineral as an olefin polymerization catalyst component (JP-A-5-295022 and JP-A-5-301917). Also, an olefin polymerization catalyst containing an acid-treated or salt-treated ion-exchange layered compound as a component is well known (JP-A-7-228621, JP-A-7-309906, JP-A-7-309907, JP-A-7-228621, JP-A-8-127613 and JP-A-10-168109). Further, an olefin polymerization catalyst containing an ion-exchange layered compound treated in the presence of an acid and a salt as a component is well known (JP-A-10-168110). However, these methods have a problem that a catalytic activity is insufficient.

The present invention provides a highly active olefin polymerization catalyst by controlling properties of a co-catalyst physically and chemically, particularly an ion-exchange layered compound.

The present inventors have noted that a certain kind of clay mineral has a function as a solid acid, and have intensively studied, and the present invention has been accomplished as a result of this study. It is necessary to use a transition metal compound belonging to Group 3 to Group 12 of the Periodic Table for polymerizing an olefin, and a certain acid is used as a means for activating such a metal compound. The present invention provides a highly active catalyst by using an ion-exchange layered silicate having a specific acid strength and acidity as a co-catalyst.

That is, the present invention provides an olefin polymerization catalyst comprising the following components (A) and (B), and an olefin polymerization catalyst component comprising the following component (A).

Component (A): an ion-exchange layered silicate having an acid site of at most −8.2 pKa, the amount of the acid site is equivalent to at least 0.05 mmol/g of 2,6-dimethylpyridine consumed for neutralization;

Component (B): a compound of a transition metal belonging to Group 3 to Group 12 of the Periodic Table.

Also, the present invention provides an olefin polymerization catalyst comprising the above components (A) and (B), and component (C) of an organic aluminum compound.

Also, the present invention provides an olefin polymerization catalyst, wherein the above component (A) is a chemically treated smectite group silicate.

Also, the present invention provides an olefin polymerization catalyst, wherein the above component (A) is an acid-treated smectite group silicate.

EXPLANATION OF COMPONENT (A)

(1) Acid Site and its Amount

The present invention employs an ion-exchange layered silicate having an acid site of at most −8.2 pKa, the amount of the acid site is equivalent to at least 0.05 mmol/g of 2,6-dimethylpyridine consumed for neutralization. The term "acid" used herein is one category classifying a material, and is defined as a material of Bronsted acid or Lewis acid. Also, the term "acid site" is defined as a constituting unit of a material exhibiting a property as an acid, and its amount is analyzed by the following titration method and is expressed as a mol amount per unit weight. An acidity of at most −8.2 pKa is usually called as "strong acidity". It has been discovered by the present invention that a polymerization activity is remarkably improved by using an ion-exchange layered silicate having a specific strong acidity site in an amount of at least a specific amount as catalyst component (A).

In determination of an acid site by titration method, 2,6-dimethylpyridine is used as a titration reagent and anthraquinone is used as an indicator. A test sample, anthraquinone and toluene are placed in a flask, and 2,6-dimethylpyridine is added dropwisely thereto until yellow color, which is an acidic color, of the indicator disappears. An amount of 2,6-dimethylpyridine added is determined to be an amount of a strong acid site of at most −8.2 of pKa of the test sample.

The state "disappearance of yellow color" means such a point that after starting a color change by adding a titration reagent, the color does not change any more by further adding the titration reagent, and it is not necessary that the color completely disappears. Also, when a sample originally has a color, it is not always a yellow color but is a color generated by adding an indicator.

When the color does not change to yellow even by adding anthraquinone as an indicator, an amount of a strong acid site of at most −8.2 pKa is considered to be 0 (nil). In order to avoid influence by oxygen and moisture, it is necessary to carry out the above titration test in an atmosphere of a purified inert gas such as nitrogen or argon. Also, when an addition speed of a titration reagent is extremely fast or slow, an accurate measurement becomes difficult. In such a case, it is necessary to add 2,6-dimethylpyridine dropwisely at a slow speed, for example, in an amount of 0.5 to 5 $\mu$mol, preferably about 1 $\mu$mol per g for 1 minute. The measurement is carried out at a temperature of 10° C.

The above method is based on the same principle as a method disclosed in J. Phys. Chem. vol. 59, p.827, 1955 by O. Johnson. If it is impossible to measure by the above titration method, other methods such as reverse titration method may be used.

An amount of a preferable acid site is equivalent to an amount of 2,6-dimethylpyridine consumed for neutralization, e.g. preferably at least 0.07 mmol, more preferably at least 0.10 mmol, most preferably at least 0.12 mmol per gram of ion-exchange layered silicate. Usually, the amount of a preferable acid site is preferably as large as possible, and its upper limit is not restricted, but practically at most 2 mmol (expressed by an amount of 2,6-dimethylpyridine), preferably at most 1 mmol.

The ion-exchange layered silicate as component (A) used in the present invention preferably has the following performance (I) or/and (II).

(I) Performance that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≧0.8;

(II) Performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)−(c)>25 (cc/g).

Measurement of adsorption and desorption isotherm by nitrogen adsorption-desorption method is explained hereinafter.

A potential energy of reciprocal action of adsorption is considered to be almost constant when a temperature is constant and a solid and a gas are determined. Accordingly, an amount of a gas adsorbed on a solid is a function to a pressure only, and a curve illustrating a relation between the two is generally called as "adsorption isotherm". In the present invention, measurement is carried out at a temperature of 77 K and a pressure is a relative pressure P/Po (Po represents atmospheric pressure), and a curve obtained when increasing the relative pressure is "adsorption isotherm" and a curve obtained when decreasing the relative pressure is "desorption isotherm".

The adsorption isotherm changes its curve shape depending on a kind of a solid, and the desorption isotherm does not correspond to the adsorption isotherm in a zone of a relative pressure P/Po of at least 0.3, and is non-reversible, and the desorption isotherm is positioned above the adsorption isotherm in a relative pressure range. This is called as an adsorption history phenomenon or an adsorption hysteresis. There is no theory to explain all of this phenomenon, but Kramer and McBain explain a theory of "ink bottle type" pore model wherein an entrance is narrower than the inside (see J. H. De Boer: "The Structure and Properties of Porous Material" p. 68 (D. H. Everett et al ed Butterworths Sci. Publications). Thus, in the ink bottle type pore, adsorption starts in the inside having a larger radius of pore and the pore is filled, whereas desorption starts at the entrance having a smaller radius of the filled pore. An equilibrium pressure at the time of desorption is smaller than that at the time of adsorption, and an adsorption amount at the entrance is smaller than an adsorption amount in the inside of pore. Accordingly, even when an adsorption amount does not substantially change, such an equilibrium pressure difference is caused, and "hysteresis" appears.

In the present invention, measurement was carried out in accordance with generally used nitrogen adsorption-desorption method. A shape of adsorption/desorption isotherm obtained by an ion-exchange layered silicate used as a catalyst component in the present invention illustrates that the pore structure of the catalyst component tends to have the ink bottle type structure, and it has been known that the isotherm shape unexpectedly has an influence on a catalytic performance, particularly catalytic activities. In view of this point, the above (b)/(a) ratio determined from the adsorption/desorption isotherm by nitrogen adsorption method is preferably at least 0.8, more preferably at least 0.9, most preferably at least 0.95. Further, the above (b)–(c) value is preferably at least 25, more preferably at least 30, most preferably at least 35.

(2) Ion-Exchange Layered Silicate

The ion-exchange layered silicate used in the present invention is a silicate compound having a crystal structure wherein planes formed by ionic bond are laminated in parallel with mutual weak bonding force, and ions contained between planes are exchangeable. Most of ion-exchange layered silicates naturally occur as the main component of clay minerals, but these ion-exchange layered silicates may be not only naturally occurred materials but also artificially synthesized materials. Also, these ion-exchange layered silicates may be subjected to the following chemical treatment.

Also, in the present invention, if these materials have ion-exchangeability at a previous stage before the treatment, their physical and chemical properties may be changed by the treatment, and a silicate having an ion-exchangeability and a layered structure lost may be included as an ion-exchange layered silicate.

Examples of the ion-exchange layered silicate include layered silicates having a 1:1 type structure or a 2:1 type structure as described in "Clay Minerals (Nendo Kobutsu Gaku)" written by Haruo Shiramizu (published by Asakura Shoten in 1995). The 1:1 type structure is a structure formed by laminating 1:1 layered structures having one layer of tetrahedral sheet and one layer of octahedral sheet combined as described in the above literature "Clay Minerals", and the 2:1 type structure is a structure formed by laminating 2:1 layered structures having one layer of octahedral sheet sandwiched between two layers of tetrahedral sheets.

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like.

Examples of an ion-exchange layered silicate comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. They may be formed into a mixed layer.

Among them, an ion-exchange layered silicate having the 2:1 type structure as the main component is preferable. A more preferable example comprises a smectite group silicate as the main component, and a particularly preferable example comprises montmorillonite as the main component.

Kinds of an intercalation cation (a cation contained between layers of an ion-exchange layered silicate) are not specially limited, but the main components are preferably an alkali metal of Group 1 of the Periodic Table such as lithium or sodium, an alkali earth metal of Group 2 of the Periodic Table such as calcium or magnesium, or a transition metal such as iron, cobalt, copper, nickel, zinc, ruthenium, rhodium, palladium, silver, iridium, platinum or gold, which are relatively easily available as industrial starting materials.

An ion-exchange layered silicate preferably has a particle size of from 0.02 to 2 $\mu$m as a primary particle.

The ion-exchange layered silicate may be used in a dry state, and may be used also in a slurry state in liquid. Also, a shape of the ion-exchange layered silicate is not specially limited, and the shape may be a naturally occurring shape, an artificially synthesized shape or a shape of an ion-exchange layered silicate obtained after subjected to pulverizing, granulating and classifying. Among these shapes, it is preferable to use a granulated ion-exchange layered silicate since such an ion-exchange layered silicate used as a catalyst component provides satisfactory polymer particle properties.

Processing of a shape of an ion-exchange layered silicate by granulating, pulverizing or classifying may be carried out before chemical treatment (that is, the ion-exchange layered silicate having a shape previously processed may be subjected to the chemical treatment), or an ion-exchange layered silicate may be subjected to processing of a shape after chemical treatment.

Examples of a granulation method used herein include a stirring granulation method, a spraying granulation method, a tumbling granulation method, a bricketing granulation method, a compacting granulation method, an extruding granulation method, a fluidized layer granulation method, an emulsifying granulation method, a suspending granulation method, a press-molding granulation method, and the like, but the granulation method is not limited thereto. Preferable examples include a stirring granulation method, a spraying granulation method, a tumbling granulation method and a fluidizing granulation method, and particularly preferable examples include a stirring granulation method and a spraying granulation method.

When carrying out the spraying granulation method, examples of a dispersion medium used for a starting slurry include water or an organic solvent such as methanol, ethanol, chloroform, methylene chloride, pentane, hexane, heptane, toluene, xylene or the like. Preferably, water is used as a dispersion medium. A concentration of component (A) in a starting material slurry for the spraying granulation method producing sphere particles is from 0.1 to 70 wt %, preferably from 1 to 50 wt %, more preferably from 5 to 30 wt %. An entrance temperature of hot air used in the spraying granulation method producing sphere particles varies depending on a dispersion medium used, but it is from 80 to 260° C., preferably from 100 to 220° C., when water is used as a dispersion medium.

Also, in the granulation step, an organic material, an inorganic solvent, an inorganic salt, various binders and the like may be used. Examples of the binders include sugar, dextrose, corn syrup, gelatin, glue, carboxymethylcelluloses, polyvinyl alcohol, water-glass, magnesium chloride, aluminum sulfate, aluminum chloride, magnetism sulfate, alcohols, glycol, starch, casein, latex, polyethylene glycol, polyethylene oxide, tar, pitch, alumina sol, silica gel, gum arabic, sodium alginate, and the like.

Sphere particles obtained as mentioned above preferably have a compression-fracture strength of at least 0.2 MPa in order to prevent crushing or powdering during a polymerization step. With regard to such a particle strength, a particle property-improving effect can be efficiently achieved when prepolymerization is carried out. Also, a particle size of a granulated ion-exchange layered silicate is in a range of from 0.1 to 1,000 $\mu$m, preferably from 1 to 500 $\mu$m. Also, the pulverizing method is not specially limited, and it may be either dry type pulverization or wet type pulverization.

(3) Chemical Treatment of Ion-Exchange Layered Silicate

The chemical treatment of an ion-exchange layered silicate is carried out by bringing it in contact with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly preferable.

A common effect achieved by chemical treatment is to exchange an intercalation cation with other cation in medium, and in addition to this effect, the following various effects can be achieved by various chemical treatments. For example, acid treatment removes impurities on the surface of silicate, and cations such as Al, Fe, Mg or the like in a crystal structure are eluted, thereby increasing a surface area. This treatment enhances an acid strength and acidity of silicate.

Alkali treatment with an alkali destroys a crystal structure of a clay mineral, and changes a structure of the clay mineral. Also, intercalation or salt treatment forms an ion composite, a molecule composite, an organic derivative or the like, and changes a surface area or a distance between layers. By using ion-exchange reaction, an exchangeable intercalated cation between layers can be replaced by other large bulky ions, thereby producing a layered material having a distance between layers enlarged. Thus, the bulky ions have a function as a column supporting the layered structure, and is called as a pillar.

Examples of treating agents are illustrated below. In the present invention, at least two kinds of members selected from the group consisting of acids, salts, alkalis, oxidizing agents, reducing agents and compounds intercalatable between layers of an ion-exchange layered silicate may be combined and used as treating agents. Also, acids, salts, alkalis, oxidizing agents, reducing agents and compounds intercalatable between layers of an ion-exchange layered silicate may be respectively used in a combination of two or more members. Among them, a combination of a salt treatment and an acid treatment is particularly preferable.

(a) Acids

An acid treatment removes impurities on the surface or ion-exchanges a cation present between layers, and in addition to this function, the acid treatment elutes a part or whole of cations such as Al, Fe, Mg or the like in a crystal structure. Examples of an acid used in the acid treatment include hydrochloric acid, nitric acid, sulfuric acid, phosphoric acid, acetic acid, oxalic acid, benzoic acid, stearic acid, propionic acid, acrylic acid, maleic acid, fumaric acid, phthalic acid, and the like. Particularly, it is preferable to use an inorganic acid.

(b) Salts

Examples of salts include salts formed from a cation selected from the group consisting of an organic cation, an inorganic cation and a metal ion and an anion selected from the group consisting of an organic anion, an inorganic anion and a halide ion. For example, preferable examples include compounds formed from a cation including at least one kind of atom selected from Group 1 to Group 14 of the Periodic Table and at least one kind of an anion selected from an anion of halogen and an anion of an inorganic Bronsted acid and an organic Bronsted acid. Particularly preferable examples include compounds formed from an anion selected from the group consisting of an anion of halogen and an anion of an inorganic Bronsted acid.

Concrete examples of these salts include $LiCl$, $LiBr$, $Li_2SO_4$, $Li_3(PO_4)$, $LiNO_3$, $Li(OOCCH_3)$, $NaCl$, $NaBr$, $Na_2SO_4$, $Na_3(PO_4)$, $NaNO_3$, $Na(OOCCH_3)$, $KCl$, $KBr$, $K_2SO_4$, $K_3(PO_4)$, $KNO_3$, $K(OOCCH_3)$, $CaCl_2$, $CaSO_4$, $Ca(NO_3)_2$, $Ca_3(C_6H_5O_7)_2$, $Sc(OOCCH_3)_2$, $Sc_2(CO_3)_3$, $Sc_2(C_2O_4)_3$, $Sc(NO_3)_3$, $Sc_2(SO_4)_3$, $ScF_3$, $ScCl_3$, $ScBr_3$, $ScI_3$, $Y(OOCCH_3)_3$, $Y(CH_3COCHCOCH_3)_3$, $Y_2(CO_3)_3$, $Y_2(C_2O_4)_3$, $Y(NO_3)_3$, $Y(ClO_4)_3$, $YPO_4$, $Y_2(SO_4)_3$, $YF_3$, $YCl_3$, $La(OOCH_3)_3$, $La(CH_3COCHCOCH_3)_3$, $La_2(CO_3)_3$, $La(NO_3)_3$, $La(ClO_4)_3$, $La_2(C_2O_4)_3$, $LaPO_4$, $La_2(SO_4)_3$, $LaF_3$, $LaCl_3$, $LaBr_3$, $LaI_3$, $Sm(OOCCH_3)_3$, $Sm(CH_3COCHCOCH_3)_3$, $Sm_2(CO_3)_3$, $Sm(NO_3)_3$, $Sm(ClO_4)_3$, $Sm_2(C_2O_4)_3$, $SmPO_4$, $Sm_2(SO_4)_3$, $SmF_3$, $SmCl_3$, $SmBr_3$, $SmI_3$, $Yb(OOCCH_3)_3$, $Yb(NO_3)_3$, $Yb(ClO_4)_3$, $Yb_2(C_2O_4)_3$, $Yb_2(SO_4)_3$, $YbF_3$, $YbCl_3$, $Ti(OOCCH_3)_4$, $Ti(CO_3)_2$, $Ti(NO_3)_4$, $Ti(SO_4)_2$, $TiF_4$, $TiCl_4$, $TiBr_4$, $TiI_4$, $Zr(OOCCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$, $Hf(OOCCH_3)_4$, $Hf(CO_3)_2$, $Hf(NO_3)_4$, $Hf(SO_4)_2$, $HfOCl_2$, $HfF_4$, $HfCl_4$, $HfBr_4$, $HfI_4$, $V(CH_3COCHCOCH_3)_3$, $VOSO_4$, $VOCl_3$, $VCl_3$, $VCl_4$, $VBr_3$, Nb $(CH_3COCHCOCH_3)_5$, $Nb_2$ $(CO_3)_5$, Nb $(NO_3)_5$, $Nb_2$ $(SO_4)_5$, $ZrF_5$, $ZrCl_5$, $NbBr_5$, $NbI_5$, Ta $(OOCCH_3)_5$, $Ta_2$ $(CO_3)_5$, Ta $(NO_3)_5$, $Ta_2$ $(SO_4)_5$, $TaF_5$, $TaCl_5$, $TaBr_5$, $TaI_5$, Cr $(OOCH_3)_2OH$, Cr $(CH_3COCHCOCH_3)_3$, Cr $(NO_3)_3$, Cr $(ClO_4)_3$, $CrPO_4$, $Cr_2$ $(SO_4)_3$, $CrO_2Cl_3$, $CrF_3$, $CrCl_3$, $CrBr_3$, $CrI_3$, $MoOCl_4$, $MoOCl_3$, $MoCl_4$, $MoCl_5$, $MoF_6$, $MoI_2$, $WCl_4$, $WCl_6$, $WF_6$, $WBr_5$, Mn $(OOCH_3)_2$, Mn $(CH_3COCHCOCH_3)_3$, $MnCO_3$, Mn $(NO_3)_2$, MnO, Mn $(ClO_4)_2$, $MnF_2$, $MnCl_2$, $MnBr_2$, $MnI_2$, Fe $(OOCH_3)_2$, Fe $(CH_3COCHCOCH_3)_3$, $FeCO_3$, Fe $(NO_3)_3$, Fe $(ClO_4)_3$, $FePO_4$, $FeSO_4$, $Fe_2$ $(SO_4)_3$, $FeF_3$, $FeCl_3$, $MnBr_3$, $FeI_3$, $FeC_6H_5O_7$, Co $(OOCH_3)_2$, Co $(CH_3COCHCOCH_3)_3$, $CoCO_3$, Co $(NO_3)_2$, $CoC_2O_4$, Co $(ClO_4)_2$, $Co_3$ $(PO_4)_2$, $CoSO_4$, $CoF_2$, $CoCl_2$, $CoBr_2$, $CoI_2$, $NiCO_3$, Ni $(NO_3)_2$, $NiC_2O_4$, Ni $(ClO_4)_2$, $NISO_4$, $NiCl_2$, $NiBr_2$, $CuCl_2$, $CuBr_2$, Cu $(NO_3)_2$, $CuC_2O_4$, Cu $(ClO_4)_2$, $CuSO_4$, Cu $(OOCCH_3)_2$, Zn $(OOCH_3)_2$, Zn $(CH_3COCHCOCH_3)_2$, $ZnCO_3$, Zn $(NO_3)_2$, Zn $(ClO_4)_2$, $Zn_3$ $(PO_4)_2$, $ZnSO_4$, $ZnF_2$, $ZnCl_2$, $ZnBr_2$, $ZnI_2$, $AlF_3$, $AlCl_3$, $AlBr_3$, $AlI_3$, $Al_2$ $(SO_4)_3$, $Al_2$ $(C_2O_4)_3$, Al $(CH_3COCHCOCH_3)_3$, Al $(NO_3)_3$, $AlPO_4$, $GeCl_4$, Sn $(OOCCH_3)_4$, Sn $(SO_4)_2$, $SnF_4$, $SnCl_4$, and the like.

Examples of an organic cation include an ammonium compound such as trimethylammonium, triethylammonium, tripropylammonium, tributylammonium, dodecylammonium, N,N-dimethylanilinium, N,N-diethylanilinium, N,N-2,4,5-pentamethylanilinium, N,N-dimethyloctadecylammonium, octadodecylammonium, N,N-2,4,5-pentamethylanilinium, N,N-dimethyl-p-n-butylanilinium, N,N-dimethyl-p-trimethylsilylanilinium, N,N-dimethyl-1-naphthylanilinium, N,N-2-trimethylanilinium, 2,6-dimethylanilinium or the like, a nitrogen-containing aromatic compound such as pyridinium, quinolinium, N-methylpiperidinium, 2,6-dimethylpyridinium, 2,2,6,6-tetramethylpiperidinium or the like, an oxonium compound such as dimethyloxonium, diethyloxonium, diphenyloxonium, furanium, oxofuranium or the like, a phosphonium compound such as triphenylphosphonium, tri-o-tolylphosphonium, tri-p-tolylphosphonium, trimesitylphosphonium or the like, and a phosphorus-containing aromatic compound such as phosphabenzonium, phosphanaphthalenium or the like, but the organic cation is not limited thereto.

In addition to the above illustrated anions, examples of other anions include an anion of a boron compound or a phosphorus compound such as hexafluorophosphate, tetrafluoroborate, tetraphenylborate or the like, but the anion is not limited thereto.

These salts may be used alone or in a mixture of two or more. Further, they may be used in combination with acids, alkalis, oxidizing agents, reducing agents, compounds intercalatable between layers of an ion-exchange layered silicate or the like. They may be combined with a treating agent to be added at the initiation of treatment, or they may be combined with a treating agent to be added during treatment.

(c) Alkalis

Examples of a treating agent used in alkali treatment include LiOH, NaOH, KOH, $Mg(OH)_2$, $Ca(OH)_2$, $Sr(OH)_2$, $Ba(OH)_2$ and the like. Since it is considered that the alkali treatment may damage an acidity of an ion-exchange layered silicate, it is preferable to carry out acid treatment after achieving a structure change of a clay mineral by alkali treatment. However, even after the alkali treatment, if an acidity and an acid amount satisfy the above-mentioned ranges, the effect of the present invention is not damaged. Examples of a preferable compound include LiOH, NaOH, KOH, $Mg(OH)_2$ or the like.

(d) Oxidizing Agents

Examples of an oxidizing agent include permanganates such as $HMnO_4$, $NaMnO_4$, $KMnO_4$ or the like, nitric acid compounds such as $HNO_3$, $N_2O_4$, $N_2O$, $Cu(NO_3)_2$, $Pb(NO_3)_2$, $AgNO_3$, $KNO_3$, $NH_4NO_3$ or the like, halogens such as $F_2$, $Cl_2$, $Br_2$ or $I_2$, peroxides such as $H_2O_2$, $Na_2O_2$, $BaO_2$, $(C_6H_5CO)_2O_2$, $K_2S_2O_8$, $K_2SO_5$, $HCO_3H$, $CH_3CO_3H$, $C_6H_5CO_3H$, $C_6H_4(COOH)CO_3H$, $CF_3CO_3H$ or the like, oxyacids such as KIO, KClO, KBrO, $KClO_3$, $KBrO_3$, $KIO_3$, $HIO_4$, $Na_3H_2I_6$, $KIO_4$ or the like, oxides such as $CeO_2$, $Ag_2O$, CuO, HgO, $PbO_2$, $Bi_2O_3$, $OSO_4$, $RuO_4$, $SeO_2$, $MnO_2$, $As_2O_5$ or the like, oxygens such as oxygen, ozone or the like, hot concentrated sulfuric acid, a mixture of fuming sulfuric acid and concentrated nitric acid, nitrobenzene, iodoso compound, and the like.

(e) Reducing Agents

Examples of a reducing agent include hydrogen and hydrogen compounds such as $H_2$, HI, $H_2S$, $LiAlH_4$, $NaBH_4$ or the like, sulfur compounds such as $SO_2$, $Na_2S$ or the like, alkali metals, alkali earth metals, metals of Group 3 to Group 10 of the Periodic Table or their alloys, metal salts of a low atomic valence state such as Fe(II), Sn(II), Ti(II), Cr(II) or the like, CO, and the like.

(f) Intercalation Compounds

Examples of a guest compound intercalated into layers of an ion-exchange layered silicate include a cationic inorganic compound such as $TiCl_4$, $ZrCl_4$ or the like, a metal alcoholate such as $Ti(OR)_4$, $Zr(OR)_4$, $PO(OR)_3$, $B(OR)_3$ (R is an alkyl group or an aryl group) or the like, a metal hydroxide ion such as $[Al_{13}O_4(OH)_{24}]^{7+}$, $[Zr_4(OH)_{14}]^{2+}$, $[Fe_3O(OCOCH_3)_6]^+$ or the like, an organic compound such as ethylene glycol, glycerol, urea, hydrazine or the like, and an organic cation such as an alkyl ammonium ion or the like.

When intercalating these compounds, a polymerized material obtained by hydrolyzing a metal alcoholate such as $Si(OR)_4$, $Al(OR)_3$, $Ge(OR)_4$ or the like, or a colloidal inorganic compound such as $SiO_2$ or the like may also be present. Examples of a pillar include an oxide or the like formed by intercalating the above hydroxide ion between layers and then dehydrating by heat. A guest compound may be used as it is or may be used after newly adsorbing water or after heat-dehydrating. Also, the guest compound may be used alone or in a mixture of two or more of the above solids.

The above-mentioned various treating agents may be used as a treating agent solution by dissolving in an appropriate solvent, or it is possible to use a treating agent itself as a solvent. Examples of a usable solvent include water, alcohols, aliphatic hydrocarbons, aromatic hydrocarbons, esters, ethers, ketones, aldehydes, furans, amines, dimethylsulfoxide, dimethylformamide, carbon disulfide, nitrobenzene, pyridines or their halides. A concentration of a treating agent in a treating agent solution is preferably from 0.1 to 100 wt %, more preferably from 5 to 50 wt %. If the treating agent concentration is within these ranges, a time required for treatment becomes shorter and an efficient production is possible.

(4) Chemical Treatment Step

Treating conditions are not specially limited, but a treating temperature is in a range of from room temperature to a boiling point of a treating agent solution and a treating time is from 5 minutes to 24 hours, and it is preferable to select these conditions so as to remove or exchange at least one part of a material constituting an ion-exchange layered silicate. Also, a ratio of an ion-exchange layered silicate and a treating agent in the chemical treatment step is not specially limited, but a ratio of an ion-exchange layered silicate (g): a treating agent (mol) is preferably in a range of from 1:0.001 to 1:0.1

After carrying out the above chemical treatment, it is preferable to remove ions eluted from the treatment and an excess amount of a treating agent. For this operation, water or an organic solvent is generally used. After dehydrating, drying is carried out generally at a drying temperature of from 100 to 800° C., preferably from 150 to 600° C. If the drying temperature exceeds 800° C., a structure of silicate tends to be unpreferably destroyed.

These ion-exchange layered silicates change their properties depending on a drying temperature employed even when their structures are not destroyed, and it is therefore preferable to change a drying temperature depending on their uses. The drying period is usually in a range of from 1 minute to 24 hours, preferably from 5 minutes to 4 hours, and a drying atmosphere is preferably dry air, dry nitrogen or dry argon, and the drying is preferably carried out under a reduced pressure. A drying method is not specially limited, but various methods may be employed.

When a chemically treated ion-exchange layered silicate is used as component (A) in the present invention, an amount of a specific acidity is measured with regard to a silicate obtained after the chemical treatment. In the present invention, it is important to control an acidity and amount of acid site by subjecting an ion-exchange layered silicate to the above-mentioned various treatments appropriately combined, so as to make an ion-exchange layered silicate having an acidity site of at most –8.2 pKa (pKa≦–8.2), the amount of the acidity site is equivalent to at least 0.05 mmol/g, preferably at least 0.07 mmol/g of 2,6-dimethylpyridine consumed for neutralization. A silicate contains various metals in a form of a pillar or a guest compound, but it is preferably that a silicate after chemical treatment contains aluminum in an atomic ratio of Al/Si in a range of from 0.05 to 0.4, preferably from 0.05 to 0.25, more preferably from 0.07 to 0.23. The Al/Si atomic ratio is regarded as an index of acid treatment of a clay part.

EXPLANATION OF COMPONENT (B)

Component (B) used in the present invention is a compound of a transition metal belonging to Group 3 to Group 12 of the Periodic Table. Examples include a halide compound of a transition metal of Group 3 to Group 10, a metallocene compound of a transition metal of Group 3 to Group 6, a bisamide or bisalkoxide compound of a transition metal of Group 4, a bisimide compound of a transition metal of Group 8 to Group 10, a phenoxyimine compound of a transition metal of Group 3 to Group 11, and the like.

Among them, a metallocene compound of a transition metal of Group 4 is preferable, examples of which include a compound expressed by the following formula (I), (II), (III), (IV), (V) or (VI).

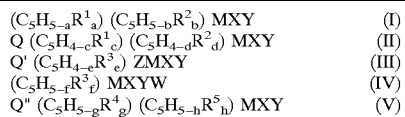

In the above formulas, Q is a bonding group crosslinking two conjugated 5-membered ring ligands, Q' is a bonding group crosslinking a Z group and a conjugated 5-membered ring ligand, Q" is a bonding group crosslinking $R^4$ and $R^5$, M is a transition metal of Group 4 to Group 6 of the Periodic Table, X, Y and W are respectively hydrogen, a halogen group, a $C_1$-$C_{20}$ hydrocarbon group, a $C_1$-$C_{20}$ oxygen-containing hydrocarbon group, a $C_1$-$C_{20}$ nitrogen-containing hydrocarbon group, a $C_1$-$C_{20}$ phosphorus-containing hydrocarbon group or a $C_1$-$C_{20}$ silicon-containing hydrocarbon group, and Z is oxygen, sulfur, a $C_1$-$C_{20}$ alkoxy group, a $C_1$-$C_{40}$ silicon-containing hydrocarbon group, a $C_1$-$C_{40}$ nitrogen-containing hydrocarbon group or a $C_1$-$C_{40}$ phosphorus-containing hydrocarbon group. Particularly, M is preferably a transition metal of Group 4 such as Ti, Zr or Hf.

$R^1$ to $R^5$ are respectively independently a $C_1$-$C_{20}$ hydrocarbon group, a halogen group, a $C_1$-$C_{20}$ halogen-containing hydrocarbon group, an alkoxy group, an aryloxy group, a silicon-containing hydrocarbon group, a phosphorus-containing hydrocarbon group, a nitrogen-containing hydrocarbon group or a boron-containing hydrocarbon group, and respective $R^1$ to $R^5$ may be the same or different and each of $R^1$ to $R^5$ may be two or more different kinds of substituents. Also, adjacent two $R^1$'s, two $R^2$'s, two $R^3$'s, two $R^4$'s or two $R^5$'s may be respectively bonded to each other to form a $C_4$–$C_{10}$ ring. The mark, a, b, c, d, e, f, g or h is an integer satisfying respectively $0 \leq a \leq 5$, $0 \leq b \leq 5$, $0 \leq c \leq 4$, $0 \leq d \leq 4$, $0 \leq e \leq 4$, $0 \leq f \leq 5$, $0 \leq g \leq 5$ or $0 \leq h \leq 5$.

Examples of a bonding group Q crosslinking two conjugated 5-membered ring ligands and a bonding group Q' crosslinking a Z group and a conjugated 5-membered ring ligand and a bonding group Q" croskinking $R^4$ and $R^5$ include an alkylene group such as a methylene group or an ethylene group, an alkylidene group such as an ethylidene group, a propylidene group, an isopropylidene group, a phenylmethylidene group or a diphenylmethylidene group, a silicon-containing crosslinking group such as a dimethylsilylene group, a diethylsilylene group, a dipropylsilylene group, a diphenylsilylene group, a methylethylsilylene group, a methylphenylsilylene group, a methyl-t-butylsilylene group, a disilylene group or a tetramethyldisilylene group, a germanium-containing crosslinking group, an alkylphosphine group, an amine group, and the like. Among them, an alkylene group, an alkylidene group, a silicon-containing crosslinking group and a germanium-containing crosslinking group are particularly preferable.

Concrete examples of a Zr complex compound expressed by the above formula (I), (II), (III), (IV), (V) or (VI) are illustrated below, but a compound having Zr replaced by Hf or Ti is usable in the same manner. Also, component (B) expressed by the formula (I), (II), (III), (IV), (V) or (VI) may be used in a mixture of two or more kinds of compounds of the same formula or two or more kinds of compounds of different formulas.

COMPOUNDS OF FORMULA (I)

Biscyclopentadienylzirconium dichloride, bis(2-methylindenyl)zirconium dichloride, bis(2-methyl-4,5-benzoindenyl)zirconium dichloride, bisfluorenylzirconium dichloride, bis(4H-azulenyl)zirconium dichloride, bis(2-methyl-4H-azulenyl)cyclopentadienylzirconium dichloride, bis(2-methyl-4-phenyl-4H-azulenyl)zirconium dichloride, bis(2-methyl-4-(4-chlorophenyl)-4H-azulenyl)zirconium dichloride, and the like.

COMPOUNDS OF FORMULA (II)

Dimethylsilylenebis(1,1'-cyclopentadienyl)zirconium dichloride, dimethylsilylenebis{1,1'-(2-methylindenyl)}- zirconium dichloride, dimethylsilylenebis{1,1'-(2-methylindenyl)}ethylenebis{1,1'-(2-methyl-4,5benzoindenyl)}zirconium dichloride, dimethylsilylenebis{1,1'-(2-methyl-4-hydroazulenyl)}zirconium dichloride, dimethylsilylenebis{1,1'-(2-methyl-4-phenyl-4-hydroazulenyl)}zirconium dichloride, dimethylsilylenebis[1,1'-{2-methyl-4-(4-chlorophenyl)-4-hydroazulenyl}]zirconium dichloride, dimethylsilylenebis{1,1'-(2-ethyl-4-phenyl-4-hydroazulenyl)}zirconium dichloride, ethylenebis{1,1'-(2-methyl-4-hydroazulenyl)}zirconium dichloride, and the like.

COMPOUNDS OF FORMULA (III)

(Tertiary butylamide)(tetramethyl-η5-cyclopentadienyl)-1,2-ethanediylzirconium dichloride, (methylamide)-(tetramethyl-η5-cyclopentadienyl)-1,2-ethanediyl-zirconium dichloride, (ethylamide)(tetramethyl-η5-cyclopentadienyl)-methylenezirconium dichloride, (tertiary butylamide)dimethyl-(tetramethyl-η5-cyclopentadienyl)silanezirconium dichloride, (tertiary butylamide)dimethyl(tetramethyl-η5-cyclopentadienyl)silanezirconium dibenzyl, (benzylamide)dimethyl(tetramethyl-η5-cyclopentadienyl)silanezirconium dichloride, (phenylphosphide)dimethyl(tetramethyl-η5-cyclopentadienyl) silanezirconium dibenzyl, and the like.

COMPOUNDS OF FORMULA (IV)

(Cyclopentadienyl)(phenoxy)zirconium dichloride, (2,3-dimethylcyclopentadienyl)(phenoxy)zirconium dichloride, (pentamethylcyclopentadienyl)-(phenoxy)zirconium dichloride, (cyclopentadienyl)(2,6-di-t-butylphenoxy)zirconium dichloride, (pentamethylcyclopentadienyl) (2,6-di-i-propylphenoxy)zirconium dichloride, and the like.

(Cyclopentadienyl)zirconium trichloride, (2,3-dimethylcyclopentadienyl)zirconium trichloride, (pentamethylcyclopentadienyl)zirconium trichloride, (cyclopentadienyl)zirconium triisopropoxide, (pentamethylcyclopentadienyl)zirconium triisopropoxide, and the like.

COMPOUNDS OF FORMULA (V)

Ethylenebis(7,7'-indenyl)zirconium dichloride, dimethylsilylenebis{7,7'-(1-methyl-3-phenylindenyl)}zirconium dichloride, dimethylsilylenebis[7,7'-{1-methyl-4-(1-naphthyl)indenyl)}]zirconium dichloride, dimethylsilylenebis{7,7'-(1-ethyl-3-phenylindenyl)}zirconium dichloride, dimethylsilylenebis[7,7'-{1-isopropyl-3-(4-chlorophenyl)indenyl}]zirconium dichloride, and the like.

Further, usable special examples of a metallocene compound include a transition metal compound having a ligand containing at least one element other than carbon in a 5-membered ring or 6-membered ring as disclosed in JP-A-7-188335 or "Journal of American Chemical Society" (1996, vol. 118, p. 2291).

Preferable examples of a bisamide compound of Group 4 of the Periodic Table include a crosslinking type transition metal compound having a bulky substituent on a nitrogen atom as disclosed in "Macromolecules" (1996, vol. 29, p. 5241), "Journal of American Chemical Society" (1997, vol. 119, No. 16, p. 3830), and "Journal of American Chemical Society" (1999, vol. 121, No. 24, p. 5798).

Also, preferable examples of a bisalkoxide compound of Group 4 of the Periodic Table include a transition metal compound of Group 4 of the Periodic Table, preferably having two aryloxy ligands bonded by a crosslinking group, more preferably a crosslinking type transition metal compound having a crosslinking group coordinated with a transition metal, as disclosed in WO87/02370.

Further, preferable examples of a bisimide compound of a transition metal of Group 8 to Group 10 of the Periodic Table include a crosslinking type transition metal bisimide compound having a bulky substituent on a nitrogen atom as disclosed in "Journal of American Chemical Society" (vol. 117, p. 6414), WO96/23010, "Chemical Communication" (p. 849), "Journal of American Chemical Society" (vol. 120, p. 4049), and WO98/27124.

Other preferable examples of a phenoxyimine compound of a transition metal of Group 3 to Group 11 include a compound as disclosed in JP-A-11-315109.

Further, these components (B) may be used in a mixture of two or more. Still further, they may be used in a combination of two or more with the above-mentioned metallocene compounds of Group 3 to Group 6 of the Periodic Table.

EXPLANATION OF COMPONENT (C)

Component (C) is an organic aluminum compound expressed by the formula $(AlR_nX_{3-n})_m$, wherein R is a $C_1$–$C_{20}$ alkyl group, X is halogen, hydrogen, an alkoxy group or an amino group, n is an integer of from 1 to 3 and m is an integer of from 1 to 2. The organic aluminum compound may be used alone or in a combination of two or more.

Examples of an organic aluminum compound include trimethylaluminum, triethylaluminum, tri-n-propylaluminum, tri-n-butylaluminum, triisobutylaluminum, tri-n-hexylaluminum, tri-n-octylaluminum, tri-n-decylaluminum, diethylaluminum chloride, diethylaluminum sesquichloride, diethylaluminum hydride, diethylaluminum ethoxide, diethylaluminum dimethylamide, diisobutylaluminum hydride, diisobutylaluminum chloride, and the like. Among them, preferable examples are a trialkylaluminum and an alkylaluminum hydride, wherein m=1 and n=3. More preferable examples are a trialkylaluminum wherein R is a $C_1$–$C_8$ alkyl group.

OLEFIN POLYMERIZATION CATALYST

In the present invention, an olefin polymerization catalyst comprising the following component (A), component (B) and optional component (C) is prepared.

Component (A): Ion-exchange layered silicate having an acid site of at most −8.2 pKa, the amount of acid site equivalent to at least 0.05 mmol/g of 2,6-dimethylpyridine consumed for neutralization.

Component (B): Transition metal compound of Group 3 to Group 12 of the Periodic Table.

Component (C): Organic aluminum compound.

(1) Preparation of Catalyst and Prepolymerization

An olefin polymerization catalyst of the present invention comprises the above component (A), component (B) and optional component (C). These components may be subjected to prepolymerization in the presence of an olefin in a polymerization reactor or outside the polymerization reactor. The term "olefin" means a hydrocarbon having at least one double bond between carbons, examples of which include ethylene, propylene, 1-butene, 1-hexene, 3-methylbutene-1, styrene, divinylbenzene and the like, but are not limited thereto, and they may be used in a mixture with other olefins. A preferable example is an olefin having at least 3 carbons.

Amounts of the above component (A), component (B) and component (C) are optional, but it is preferable to have component (B) and component (C) contacted so as to make a transition metal of component (B) and aluminum of component (C) in a ratio of 0.1–1,000 ($\mu$mol):0–100,000 ($\mu$mol) per g of component (A).

An order of making the above component (A), component (B) and component (C) contact with each other is optional, and after making two of the components contact with each other, another remaining component may be made contact therewith, or the three components may be contacted at the same time. In order to make these components fully contact with each other, a solvent may be used. Examples of the solvent include an aliphatic saturated hydrocarbon, an aromatic hydrocarbon, an aliphatic unsaturated hydrocarbon, or their halides, or a prepolymerization monomer, and the like.

After prepolymerization, a catalyst may be dried. A drying method is not specially limited, but examples of a drying method include drying under a reduced pressure, drying by heat, drying by flowing a dry gas, and the like, and these methods may be used alone or in a combination of two or more methods. In a drying step, a catalyst may be stirred, vibrated, fluidized or allowed to stand.

(2) Polymerization

Polymerization by using an olefin polymerization catalyst comprising the above component (A), component (B) and optional component (C) is carried out by mixing with an olefin alone or with a mixture of the olefin and other comonomers to be contacted therewith. In a case of copolymerization, an amount ratio of respective monomers in the reaction system is not necessarily constant as a lapse of time, and it may be convenient to supply respective monomers in a constant mixing ratio, and it is possible to change a mixing ratio of monomers to be supplied as a lapse of time. Also, in view of a copolymerization reaction ratio, any of monomers may be dividedly added.

Examples of a polymerizable olefin include a compound having a carbon number of from 2 to 20, such as ethylene, propylene, 1-butene, 1-hexene, 1-octene, styrene, divinylbenzene, 7-methyl-1,7-octadiene, cyclopentene, norbornene, ethylidenenorbornene, and the like. Preferable examples include an α-olefin having a carbon number of from 2 to 8. In the case of copolymerization, a kind of comonomers to be used may be an olefin selected from the above olefins, which is other than the main component.

Any polymerization method may be used as long as a catalyst component is contacted with respective monomers efficiently. Examples of the polymerization method include a slurry polymerization method using an inert solvent, a polymerization method using propylene as a solvent without substantially using an inert solvent, a solution polymerization method or a gas phase polymerization method maintaining respective monomers in a gas state without substantially using a liquid solvent. Also, a continuous polymerization method, a batchwise polymerization method or a prepolymerization method may be used.

In the case of a slurry polymerization, as a polymerization solvent, a saturated aliphatic hydrocarbon or an aromatic hydrocarbon, such as hexane, heptane, pentane, cyclohexane, benzene or toluene, may be used alone or in a mixture. A polymerization temperature is from 0 to 150° C., and hydrogen may be used as a molecular weight modifier to control a molecular weight. A polymerization pressure is from 0 to 2,000 kg/cm$^2$G, preferably from 0 to 60 kg/cm$^2$G.

EXAMPLES

The present invention is further illustrated with reference to the following Examples, but should not be limited thereto.

In the present Examples, a measurement method is illustrated below.

(1) MFR: Melt index in accordance with JIS-K-6758

(2) Measurement of acidity amount:

Amount of acid site of at most −8.2 pKa: 2,6-dimethylpyridine was used as a titration reagent, and anthraquinone was used as an indicator. The measurement was carried out at 10° C. 20 ml of toluene was added to 0.40 g of silicate sample to prepare a slurry in a three-forked flask, the content of which was replaced by nitrogen, and 2.0 ml of 0.1 wt % toluene solution of anthraquinone as an indicator was added thereto to change its color to yellow. 2,6-Dimethylpyridine (toluene solution 0.01 M) was added dropwisely into the flask at a rate of from 0.5 to 5 $\mu$mol per g for one minute, and an amount of 2,6-dimethylpyridine added until the yellow acidic color of the indicator disappeared was determined to be an amount of acid site of at most −8.2 pKa.

EXAMPLE 1

(1-1) Chemical Treatment of Ion-Exchange Layered Silicate

In a separable flask, 190 g of distilled water was added to 66 g of magnesium sulfate 7 hydrate to prepare a solution, and 54 g of 96% sulfuric acid was added thereto. Thereafter, 50 g of smectite group silicate (Benclay SL manufactured by Mizusawa Kagaku K.K.) was added thereto at 30° C. At this time, a concentration of sulfuric acid was 17 wt % in the reaction system. This slurry was heated to 100° C. at a rate of 1.2° C./minute for 1 hour, and was reacted at 100° C. for 120 minutes. The reaction slurry was cooled to room temperature for 1 hour, and was rinsed with distilled water to pH 3. A solid obtained was predried in a nitrogen stream at 130° C. for 2 days, and large particles having a size of at least 53 $\mu$m were removed, and the resultant product was further dried at 200° C. for 2 hours under a reduced pressure to obtain 36.8 g of chemically treated smectite. The chemically treated smectite thus obtained had a composition of Al: 6.6 wt %, Si: 38.0 wt %, Mg: 1.4 wt %, Fe: 1.6 wt %, Na<0.2 wt % and Al/Si=0.181 (mol/mol). An amount of an acid site of at most −0.8 pKa of the chemically treated smectite thus obtained was equivalent to 0.130 mmol per g of 2,6-dimethylpyridine consumed for neutralization. Analytical results by nitrogen adsorption method showed a (b)/(a) value of 0.97 and a (b)−(c) value of 37.2.

(1-2) Prepolymerization 10 g of the above obtained chemically treated smectite was placed in a 1 l three-necked flask, the atmosphere of which was replaced by dry nitrogen, and 192 ml of heptane was added thereto to prepare a slurry, and 5 mmol of triethylaluminum (8.4 ml of a heptane solution having a concentration of 68 mg/ml) was added thereto, and the mixture was stirred for 1 hour, and was rinsed with heptane (rinsing magnification: 1/100), and the total content was made 200 ml by adding heptane thereto. The slurry thus obtained was introduced into a 1 l autoclave.

In another flask (volume: 200 ml), (dimethylsilylenebis (2-methyl-4-(p-chlorophenyl)-4H-azulenyl)hafnium dichloride (163 mg: 0.2 mmol) was added to toluene to prepare a slurry, and triisobutylaluminum (2 mmol: 2.75 ml of a heptane solution having a concentration of 145 mg/ml) was added thereto, and the resultant mixture was reacted under stirring at room temperature for 10 minutes to obtain a uniform solution. The solution thus obtained was introduced into a 1 l autoclave containing the chemically treated smectite reacted with the above triethylaluminum. 235 ml of heptane was further added to this autoclave. This slurry was stirred at 40° C. for 30 minutes in the autoclave.

Thereafter, prepolymerization was carried out at 40° C. for 2 hours by feeding propylene at a flow rate of 10 g/hour into the autoclave. Thereafter, after stopping feeding propylene, the inside temperature was maintained at 40° C., and polymerization was carried out further for 2 hours. A supernatant liquid of the catalyst slurry thus obtained was removed by decantation, and triisobutylaluminum (8 mmol: 11 ml of a heptane solution having a concentration of 145 mg/ml) as an agent of preventing poisoning was added to the remaining portion, and the mixture was stirred for 10 minutes, and then dried at 40° C. for 3 hours under a reduced pressure to obtain 14.6 g of a dry prepolymerization-catalyst. A prepolymerization magnification (a value obtained by dividing an amount of propylene polymerized by a solid catalyst amount) was 0.46.

(1-3) Polymerization of Propylene 2.86 ml of a heptane solution (140 mg/ml) of triisobutylaluminum was charged into a 3 l autoclave at 30° C., and 750 g of liquid propylene was introduced thereinto, and the above prepolymerization-catalyst was charged in an amount of 50 mg (weight of the prepolymerization-catalyst from which an amount of the polymer prepolymerized was subtracted) into a polymerization reactor with a high pressure argon. The resultant reaction mixture was heated to 75° C., and was polymerized for 2 hours. The polymer thus obtained was 196.7 g, and had a MFR value of 0.24 dg/minute. This catalyst had an activity of 1967 (g polymer/g catalyst·hour), and was highly active.

EXAMPLE 2

(2-3) Copolymerization of Ethylene-Propylene 2.86 ml of a heptane solution (140 mg/ml) of triisobutylaluminum was charged into a 3 l autoclave at 30° C., and 750 g of liquid propylene and 15 g of ethylene were introduced thereinto, and the prepolymerization catalyst obtained in Example 1-2 was charged in an amount of 30 mg (weight of the prepolymerization-catalyst from which an amount of the polymerized polymer was subtracted) into a polymerization reactor with a high pressure argon. The resultant mixture was heated to 75° C., and was polymerized for 1 hour. The polymer thus obtained had an ethylene content of 1.6 wt % and a MFR value of 0.22 dg/minute. This catalyst had an activity of 6767 (g polymer/g catalyst·hour), and was highly active.

EXAMPLE 3

(3-1) Chemical Treatment of Ion-Exchange Layered Silicate

The same procedure as in Example 1-1 was repeated, except that 100 g of smectite group silicate (Benclay SL manufactured by Mizusawa Kagaku K.K.), 133 g of magnesium sulfate 7 hydrate, 660 g of distilled water and 109 g of sulfuric acid were used, and 80 g of chemically treated smectite was obtained. The chemically treated smectite thus obtained had a composition of Al: 7.8 wt %, Si: 36.7 wt %, Mg: 1.6 wt %, Fe: 2.1 wt %, Na<0.2 wt % and Al/Si=0.221 (mol/mol). The amount of the acid site of at most −0.8 pKa of the chemically treated smectite was equivalent to an amount of 0.125 mmol per g of 2,6-dimethylpyridine consumed for neutralization. Analytical results by nitrogen adsorption method showed a (b)/(a) value of 0.98 and a (b)−(c) value of 42.7.

(3-2) Prepolymerization

Prepolymerization was carried out in the same manner as in Example 1-2 except that the above obtained chemically treated smectite was used, and 27.5 g of a dry prepolymerization catalyst was obtained. Prepolymerization magnification was 1.75.

(3-3) Polymerization of Propylene

Propylene polymerization was carried out in the same manner as in Example 1-3, except that the above prepared prepolymerization catalyst was used, and 253.3 g of a polymer having a MFR value of 0.18 dg/minute was obtained. This catalyst had an activity of 2533 (g polymer/g catalyst·hour), and was highly active.

EXAMPLE 4

(4-3) Copolymerization of Ethylene-Propylene

Copolymerization of ethylene-propylene was carried out in the same manner as in Example 2-3, except that the prepolymerization catalyst obtained in Example 3-2 was used. The polymer thus obtained had an ethylene content of 1.5 wt % and a MFR value of 0.15 dg/minute. This catalyst had an activity of 6933 (g polymer/g catalyst·hour), and was highly active.

EXAMPLE 5

(5-1) Chemical Treatment of Ion-Exchange Layered Silicate

The same procedure as in Example 1-1 was repeated, except that 300 g of smectite group silicate (Benclay SL manufactured by Mizusawa Kagaku K.K.), 1,130 g of distilled water and 750 g of sulfuric acid were used but magnesium sulfate 7 hydrate was not used, and a concentration of sulfuric acid in the reaction system was made 40 wt %, and the reaction was carried out at 90° C. for 390 minutes, and as this result, 133 g of chemically treated smectite was obtained. The chemically treated smectite thus obtained had a composition of Al: 4.5 wt %, Si: 40.7 wt %, Mg: 0.7 wt %, Fe: 1.3 wt %, Na<0.2 wt % and Al/Si=0.116 (mol/mol). The acid site amount of acid site of at most −8.2 pKa, was equivalent to an amount of 0.08 mmol per g of 2,6-dimethylpyridine consumed for neutralization. Analytical results by nitrogen adsorption method showed a (b)/(a) of 0.97 and a (b)−(c) of 79.5.

(5-2) Prepolymerization 20 g of the above obtained chemically treated smectite was charged into a three-necked flask (volume: 1 l), and heptane (183 ml) was added thereto to prepare a slurry, and triethylaluminum (10 mmol: 16.8 ml of a heptane solution having a concentration of 68 mg/ml), and the resultant mixture was stirred for 1 hour, and the reaction mixture was rinsed with heptane to 1/100, and the total content was made 200 ml by adding heptane thereto.

In another flask (volume: 200 ml), (dimethylsilylenebis (2-methyl-4-(p-chlorophenyl)-4H-azulenyl)zirconium dichloride (0.3 mmol) was added to heptane (87 ml) containing 3 wt % of toluene to prepare a slurry, and triisobutylaluminum (3 mmol: 4.26 ml of a heptane solution having a concentration of 140 mg/ml) was added thereto, and the mixture was reacted by stirring at room temperature for 60 minutes to obtain a uniform solution. This solution was introduced into the above 1 l flask (containing triethylaluminum and the reacted chemically treated smectite), and the resultant mixture was stirred at room temperature for 60 minutes. Thereafter, 213 ml of heptane was further added thereto, and this slurry was introduced into a 1 l autoclave.

The inside temperature of the autoclave was made 40° C., and propylene was then supplied thereto at a flow rate of 20 g/hour, and the mixture was maintained at 40° C. for 2 hours to carry out prepolymerization. Thereafter, after stopping feeding propylene, the inside temperature was increased 50° C., and polymerization was further carried out for 2 hours. A supernatant liquid of the catalyst slurry thus obtained was removed by decantation, and triisobutylaluminum (12 mmol: 17 ml of a heptane solution having a concentration of 140 mg/ml) as an agent for preventing poisoning was added to the remaining portion, and the mixture was stirred for 10 minutes. This solid was dried for 3 hours under a reduced pressure to obtain 63.6 g of a dry prepolymerization catalyst. Prepolymerization magnification was 2.18.

(5-3) Polymerization of Propylene 2.86 ml of a heptane solution (140 mg/ml) of triisobutylaluminum was charged into a 3 l autoclave, and 750 g of liquid propylene and 102 ml of hydrogen (volume in normal state) were charged thereinto, and the mixture was heated to 70° C. Thereafter, the above obtained prepolymerization-catalyst was charged in an amount of 50 mg (weight from which an amount of the prepolymerized polymer was subtracted) into a polymerization reactor with a high pressure argon, and the resultant mixture was polymerized at 70° C., for 1 hour. The polymer thus obtained was 163 g, and had a MFR value of 31.2 dg/minute This catalyst had an activity of 3260 (g polymer/g catalyst·hour), and was highly active.

EXAMPLE 6

(6-3) Copolymerization of Ethylene-Propylene 2.86 ml of a heptane solution (140 mg/ml) of triisobutylaluminum was charged into a 3 l autoclave, and 750 g of liquid propylene and 15 g of ethylene were introduced thereinto, and the mixture was heated to 70° C. Thereafter, the prepolymerization-catalyst obtained in Example 5-2 was charged in an amount of 30 mg (weight from which an amount of the polymer prepolymerized was subtracted) into a polymerization reactor with a high pressure argon, and the resultant mixture was polymerized at 70° C., for 1 hour. The polymer thus obtained was 236 g, and had an ethylene content of 1.8 wt % and a MFR value of 1.8 dg/minute. This catalyst had an activity of 7870 (g polymer/g catalyst·hour), and was highly active.

COMPARATIVE EXAMPLE 1

Comparative 1-1 Chemical Treatment of Ion-Exchange Layered Silicate

In a separable flask, 7,730 g of distilled water was added to 2,660 g of magnesium sulfate 7 hydrate to prepare a solution, and 2,180 g of 96% sulfuric acid was added thereto, and 2,000 g of smectite group silicate (Kunipia F manufactured by Kunimine Kogyo K.K.) was then added thereto at 30° C., and as this result, a sulfuric acid concentration in the reaction system was 17 wt %. This slurry was heated to 100° C., at a rate of 1.2° C./minute for 1 hour, and was reacted at 100° C., for 120 minutes. This reaction slurry was cooled to room temperature for 1 hour, and was washed with distilled water to pH 3. The solid thus obtained was made into an aqueous slurry which was then spray-dried to be granulated. The product was further dried at 200° C., for 2 hours under a reduced pressure to obtain 1,300 g of chemically treated smectite. The chemically treated smectite thus obtained had a composition of Al: 9.1 wt %, Si: 36.0 wt %, Mg: 2.0 wt %, Fe: 1.4 wt %, Na<0.2 wt % and Al/Si=0.263 (mol/mol). The amount of an acid site of at most −8.2 pKa, was equivalent to an amount of 0.036 mmol per g of 2,6-dimethylpyridine consumed for neutralization. Analytical results by nitrogen adsorption method showed a (b)/(a) value of 0.45 and a (b)·(c) of 10.9.

Comparative 1-2 Prepolymerization

Prepolymerization was carried out in the same manner as in Example 1-2 except that the above obtained chemically treated smectite was used, and 29.2 g of a dry prepolymerization catalyst was obtained. Prepolymerization magnification was 1.92.

Comparative 1-3 Polymerization of Propylene

Polymerization of propylene was carried out in the same manner as in Example 1-3, except that the above obtained prepolymerization-catalyst was used, and 70.4 g of a polymer having a MFR value of 0.25 dg/minute was obtained. This catalyst had an activity of 704 (g polymer/g catalyst·hour), and thus the activity was low.

COMPARATIVE EXAMPLE 2

Comparative 2-3 Copolymerization of Ethylene-Propylene

Copolymerization of ethylene-propylene was carried out in the same manner as in Example 2 except that the prepolymerization catalyst obtained in Comparative Example 1-2 was used. The polymer thus obtained had an ethylene content of 1.6 wt % and a MFR value of 0.09 dg/minute. This catalyst had an activity of 1873 (g polymer/g catalyst·hour), and thus the activity was low.

COMPARATIVE EXAMPLE 3

Chemical Treatment of Silicate 150 ml of demineralized water and 25.7 g of lithium sulfate monohydrate were charged into a glass made flask and 19.6 g of concentrated sulfuric acid was slowly added thereto, and 40.8 g of a commercially available mica (ME-100 manufactured by Corp Chemical K.K.) was then dispersed therein, and the resultant mixture was stirred at room temperature for 2 hours. Thereafter, the resultant mica was fully rinsed with demineralized water, and was dried at 110° C., overnight.

The chemically treated mica thus obtained had a composition of Al/Si=0.002, Mg/Si=0.66 and Na/Si=0.026. An amount of an acid site of at most −8.2 pKa was supposed to be almost nil (0) since there was no color change of an indicator, and thus the amount was lower than the detection limit (0.005 mmol/g). Analytical results by nitrogen adsorption method showed a (b)/(a) value of 0.49 and a (b)−(c) value of 13.6.

Preparation of Catalyst/Prepolymerization/
Polymerization

The same procedure as in Example 1 was repeated, except that the above obtained chemically treated silicate was used.

As this result, the catalyst thus prepared had a catalytic activity of 125 g-PP/g-catalyst·hour and a MFR value of 1.2.

COMPARATIVE EXAMPLE 4

Chemical Treatment of Silicate 300 ml of demineralized water was charged into a glass-made flask and 53.4 ml of titanium tetrachloride was slowly added thereto, and 30 g of a commercially available lithium hectorite (manufactured by Topy Kogyo K.K.) was dispersed therein, and the resultant mixture was stirred at room temperature for 2 hours. Thereafter, the hectorite thus treated was fully rinsed with demineralized water, and was dried at 110° C., overnight.

In the chemically treated hectorite thus obtained, an amount of the acid site of at most −8.2 pKa was supposed to be almost nil since there was no color change of an indicator, and thus the amount was lower than the detection limit (0.005 mmol/g). Analytical results by nitrogen adsorption method showed a (b)/(a) value of 0.64 and a (b)–(c) value of 8.6.

Preparation of Catalyst/Prepolymerization/Polymerization

The same procedure as in Example 1 was repeated, except that the above obtained chemically treated silicate was used. As this result, the catalyst thus prepared had a catalytic activity of 57.2 g-PP/g-catalyst·hour.

EXAMPLE 7

Prepolymerization

Prepolymerization was carried out in the same manner as in Example 5, except that (γ)-dimethylsilylenebis[2-methyl-4-(4-chlorophenyl)-4H-azulenyl]zirconium dichloride was used. As this result, prepolymerization magnification was 1.99.

Copolymerization of Ethylene-Propylene

The same procedure as in Example 6 was repeated, except that the above prepolymerization catalyst prepared in Example 7 was used in an amount of 15 mg (weight from which an amount of the polymer prepolymerized was subtracted) and 34 ml of hydrogen was added. As this result, 168.0 g of a polymer was obtained. The catalyst had a catalytic activity of 11,200 g-PP/g-catalyst·hour, an ethylene content of 1.57 wt % and a MFR value of 6.73.

COMPARATIVE EXAMPLE 5

Prepolymerization

Prepolymerization was carried out in the same manner as in Example 7, except that the ion-exchange layered silicate used in Comparative Example 1 was used.

Copolymerization of Ethylene-Propylene

The same procedure as in Example 7 was repeated, except that the prepolymerization-catalyst prepared in Comparative Example 5 was used. The catalyst had a catalytic activity of 7,500 g-PP/g-catalyst·hour, an ethylene content of 1.61 wt % and a MFR value of 7.05.

EXAMPLE 8

Prepolymerization

Prepolymerization was carried out in the same manner as in Example 7, except that (γ)-dimethylsilylenebis(2-methyl-4-phenylindenyl)zirconium dichloride was used. As this result, prepolymerization magnification was 1.86.

Copolymerization of Ethylene-Propylene

The same procedure as in Example 7 was repeated, except that the catalyst prepared in Example 8 was used. As this result, 117.5 g of a polymer was obtained. The catalyst had a catalytic activity of 7,830 g-PP/g-catalyst·hour, an ethylene content of 1.65 wt % and a MFR value of 3.87.

COMPARATIVE EXAMPLE 6

Prepolymerization

Prepolymerization was carried out in the same manner as in Example 8, except that the ion-exchange layered silicate used in Comparative Example 1 was used.

Copolymerization of Ethylene-Propylene

The same procedure as in Example 8 was repeated, except that the prepolymerization-catalyst prepared in Comparative Example 6 was used. As this result, the catalyst had a catalytic activity of 3,200 g-PP/g-catalyst·hour, an ethylene content of 1.65 wt % and a MFR value of 4.41.

The results of Examples 1 to 8 and Comparative Examples 1 to 6 are shown in the following Tables 1 and 2. Table 1 shows the starting materials of component (A) and the results of chemical treatment, and Table 2 shows polymerization activities of catalysts prepared by using respectively chemically treated component (A).

TABLE 1

Starting materials of component (A) and results of chemical treatment

| | Silicate | Chemical treatment | mmol/g of pKa ≤ −8.2 | Al | Si | Mg | Fe | Al/Si | Hysteresis (b)/(a) | (b)−(c) |
|---|---|---|---|---|---|---|---|---|---|---|
| Ex. 1 | Smectite group (Benclay SL) | Magnesium sulfate + sulfuric acid(17%) | 0.130 | 6.6 | 38.0 | 1.4 | 1.6 | 0.18 | 0.97 | 37.2 |
| Ex. 2 | Smectite group (Benclay SL) | Magnesium sulfate + sulfuric acid(17%) | 0.130 | 6.6 | 38.0 | 1.4 | 1.6 | 0.18 | 0.97 | 37.2 |

TABLE 1-continued

Starting materials of component (A) and results of chemical treatment

|  | Silicate | Chemical treatment | mmol/g of pKa ≦ −8.2 | Main elements (wt %) | | | | | Hysteresis | |
|---|---|---|---|---|---|---|---|---|---|---|
|  |  |  |  | Al | Si | Mg | Fe | Al/Si | (b)/(a) | (b)-(c) |
| Ex. 3 | Smectite group (Benclay SL) | Magnesium sulfate + sulfuric acid(12%) | 0.125 | 7.8 | 36.7 | 1.6 | 2.1 | 0.221 | 0.98 | 42.7 |
| Ex. 4 | Smectite group (Benclay SL) | Magnesium sulfate + sulfuric acid(12%) | 0.125 | 7.8 | 36.7 | 1.6 | 2.1 | 0.221 | 0.98 | 42.7 |
| Ex. 5 | Smectite group (Benclay SL) | Sulfuric acid(40%) | 0.08 | 4.5 | 40.7 | 0.7 | 1.3 | 0.116 | 0.97 | 79.5 |
| Ex. 6 | Smectite group (Benclay SL) | Sulfuric acid(40%) | 0.08 | 4.5 | 40.7 | 0.7 | 1.3 | 0.116 | 0.97 | 79.5 |
| Comp. Ex. 1 | Smectite group (Kunipia F) | Magnesium sulfate + sulfuric acid(17%) | 0.036 | 9.1 | 36.0 | 2.0 | 1.4 | 0.263 | 0.45 | 10.9 |
| Comp. Ex. 2 | Smectite group (Kunipia F) | Magnesium sulfate + sulfuric acid(17%) | 0.036 | 6.6 | 36.0 | 2.0 | 1.4 | 0.263 | 0.45 | 10.9 |
| Comp. Ex. 3 | Mica (ME-100) | Lithium sulfate + sulfuric acid(10%) | ND | 0.06 | 27.7 | 15.8 | — | 0.002 | 0.49 | 13.6 |
| Comp. Ex. 4 | Li Hectorite | Titanium tetrachloride(24%) | ND | — | 27.8 | 14.4 | — | — | 0.64 | 8.6 |
| Ex. 7 | Smectite group (Benclay SL) | Sulfuric acid(40%) | 0.08 | 4.5 | 40.7 | 0.7 | 1.3 | 0.116 | 0.97 | 79.5 |
| Comp. Ex. 5 | Smectite group (Kunipia F) | Magnesium sulfate + sulfuric acid(17%) | 0.036 | 9.1 | 36.0 | 2.0 | 1.4 | 0.263 | 0.45 | 10.9 |
| Ex. 8 | Smectite group (Benclay SL) | Sulfuric acid(40%) | 0.08 | 4.5 | 40.7 | 0.7 | 1.3 | 0.116 | 0.97 | 79.5 |
| Comp. Ex. 6 | Smectite group (Kunipia F) | Magnesium sulfate + sulfuric acid(17%) | 0.036 | 9.1 | 36.0 | 2.0 | 1.4 | 0.263 | 0.45 | 10.9 |

TABLE 2

Polymerization activity of catalyst

Polymerization results

| | Prepolymerization magnification | Aimed product | Catalytic activity (g polymer/g catalyst · hour) | MFR | Ethylene content (wt %) |
|---|---|---|---|---|---|
| Ex. 1 | 0.46 | PP homopolymer | 1967 | 0.24 | — |
| Ex. 2 | 0.46 | EP copolymer | 6767 | 0.22 | 1.6 |
| Ex. 3 | 1.75 | PP homopolymer | 2533 | 0.18 | — |
| Ex. 4 | 1.75 | EP copolymer | 6933 | 0.15 | 1.5 |
| Ex. 5 | 2.18 | PP homopolymer | 3260 | 31.2 | — |
| Ex. 6 | 2.18 | EP copolymer | 7870 | 1.8 | 1.8 |
| Comp. Ex. 1 | 1.92 | PP homopolymer | 704 | 0.25 | — |
| Comp. Ex. 2 | 1.92 | EP copolymer | 1873 | 0.09 | 1.6 |
| Comp. Ex. 3 | 0.41 | PP homopolymer | 125 | 1.2 | — |
| Comp. Ex. 4 | 0.22 | PP homopolymer | 57.2 | — | — |
| Ex. 7 | 1.99 | EP copolymer | 11200 | 6.73 | 1.57 |
| Comp. Ex. 5 | 2.10 | EP copolymer | 7500 | 7.05 | 1.61 |
| Ex. 8 | 1.86 | EP copolymer | 7830 | 3.87 | 1.65 |
| Comp. Ex. 6 | 1.98 | EP copolymer | 3200 | 4.41 | 1.65 |

As evident from the above results, according to the present invention, a polymerization activity of homopolymerization of propylene was improved by 2 times to 40 times, and also a polymerization activity of ethylene-propylene copolymerization was improved about 3 times.

Thus, according to the present invention, a highly active polyolefin polymerization catalyst can be prepared. The catalyst of the present invention is effective as a catalyst for polymerization and copolymerization of α-olefin such as ethylene, propylene, butene-1, hexane-1 and the like.

What is claimed is:

1. An olefin polymerization catalyst comprising the following components (A) and (B):
   Component (A): an ion-exchange layered silicate having an acid site of at most −8.2 pKa, the amount of the acid site is equivalent to at least 0.05 mmol/g of 2,6-dimethylpyridine consumed for neutralization; and
   Component (B): a compound of a transition metal belonging to Group 3 to Group 12 of the Periodic Table.

2. An olefin polymerization catalyst comprising the following components (A), (B) and (C):
   Component (A): an ion-exchange layered silicate having an acid site of at most −8.2 pKa, the amount of the acid site is equivalent to at least 0.05 mmol/g of 2,6-dimethylpyridine consumed for neutralizations;
   Component (B): a compound of a transition metal belonging to Group 3 to Group 12 of the Periodic Table; and
   Component (C): an organic aluminum compound.

3. The olefin polymerization catalyst according to claim 1 or 2, wherein component (A) is a chemically treated smectite group silicate.

4. The olefin polymerization catalyst according to claim 3, wherein component (A) is an acid-treated smectite group silicate.

5. The olefin polymerization catalyst according to claim 4, wherein component (A) is an acid-treated smectite group silicate and an atomic ratio (Al/Si) of aluminum and silicon is in a range of from 0.05 to 0.4.

6. The olefin polymerization catalyst according to claim 5, wherein the atomic ratio (Al/Si) of aluminum and silicon is in a range of from 0.05 to 0.25.

7. An olefin polymerization catalyst obtained by having the following components (A) and (B) contacted in the presence of an olefin:

Component (A): an ion-exchange layered silicate having an acid site of at most −8.2 pKa, the amount of the acid site is equivalent to at least 0.05 mmol/g of 2,6-dimethylpyridine consumed for neutralization; and Component (B): a compound of a transition metal belonging to Group 3 to Group 12 of the Periodic Table.

8. An olefin polymerization catalyst obtained by having the following components (A), (B) and (C) contacted in the presence of an olefin:

Component (A): an ion-exchange layered silicate having an acid site of at most −8.2 pKa, the amount of the acid site is equivalent to at least 0.05 mmol/g of 2,6-dimethylpyridine consumed for neutralization;

Component (B): a compound of a transition metal belonging to Group 3 to Group 12 of the Periodic Table; and Component (C): an organic aluminum compound.

9. The olefin polymerization catalyst according to claim 1 or 2, wherein component (A) has the following performance (I):

(I) that in desorption isotherm by nitrogen adsorption-desorption method, a ratio of a remaining adsorption amount (b) at a relative pressure $P/P_o=0.85$ to an adsorption amount (a) at a relative pressure $P/P_o=1$ satisfies the formula, $(b)/(a) \geqq 0.8$.

10. The olefin polymerization catalyst according to claim 1 or 2, wherein component (A) has the following performances (I) and (II):

(I) Performance that in desorption isotherm by nitrogen adsorption-desorption method, a ratio of a remaining adsorption amount (b) at a relative pressure $P/P_o=0.85$ to an adsorption amount (a) at a relative pressure $P/P_o=1$ satisfies the formula, $(b)/(a) \geqq 0.8$; and (II) Performance that in adsorption isotherm and desorption isotherm by nitrogen adsorption-desorption method, a difference between a remaining adsorption amount (b) of desorption isotherm at a relative pressure $P/P_o=0.85$ and an adsorption amount (c) of adsorption isotherm at a relative pressure $P/P_o=0.85$ satisfies the formula, $(b)-(c)>25$ (cc/g).

11. A catalyst component for olefin polymerization, which comprises an ion-exchange layered silicate having an acid site of at most −8.2 pKa, the amount of the acid site is equivalent to at least 0.05 mmol/g of 2,6-dimethylpyridine consumed for neutralization.

12. An ion-exchange layered silicate for an olefin polymerization catalyst having an acid site of at most −8.2 pKa, the amount of the acid site is equivalent to at least 0.05 mmol/g of 2,6-dimethylpyridine consumed for neutralization.

13. A method for polymerizing an olefin, which comprises using a catalyst as claimed in claim 1 or 2.

* * * * *